United States Patent
Tian et al.

(10) Patent No.: US 10,246,523 B2
(45) Date of Patent: Apr. 2, 2019

(54) FLUORESCENT STARCH NANOCRYSTAL AND PREPARATION METHOD AND APPLICATION THEREOF

(71) Applicant: Jiangnan University, Wuxi (CN)

(72) Inventors: Yaoqi Tian, Wuxi (CN); Canxin Cai, Wuxi (CN); Benxi Wei, Wuxi (CN); Zhengyu Jin, Wuxi (CN); Jinpeng Wang, Wuxi (CN); Xueming Xu, Wuxi (CN); Na Yang, Wuxi (CN); Xiuting Hu, Wuxi (CN)

(73) Assignee: Jiangnan University, Wuxi (CN)

( * ) Notice: Subject to any disclaimer, the term of this patent is extended or adjusted under 35 U.S.C. 154(b) by 108 days.

(21) Appl. No.: 15/314,861

(22) PCT Filed: Aug. 4, 2015

(86) PCT No.: PCT/CN2015/085999
§ 371 (c)(1),
(2) Date: Nov. 29, 2016

(87) PCT Pub. No.: WO2017/020238
PCT Pub. Date: Feb. 9, 2017

(65) Prior Publication Data
US 2017/0183422 A1 Jun. 29, 2017

(51) Int. Cl.
*C08B 31/00* (2006.01)
*C09K 11/06* (2006.01)

(52) U.S. Cl.
CPC ............ *C08B 31/006* (2013.01); *C08B 31/00* (2013.01); *C09K 11/06* (2013.01); *C09K 2211/145* (2013.01)

(58) Field of Classification Search
CPC .. C08B 31/006; C09K 11/06; C09K 2211/145
USPC .......................................................... 521/55
See application file for complete search history.

(56) References Cited

U.S. PATENT DOCUMENTS 4,820,749 A * 4/1989 Beshay ................ C08F 251/02
523/203

OTHER PUBLICATIONS

Selim et al. Surface Modification of Magnetites Using Maltotrionic Acid and Folic Acid for Molecular Imaging. Macromolecular Research, vol. 14, No. 6, pp. 646-653 (2006). (Year: 2006).*
Angellier et al. Optimization of the Preparation of Aqueous Suspensions of Waxy Maize Starch Nanocrystals Using a Response Surface Methodology. Biomacromolecules 2004, 5, 1545-1551. (Year: 2004).*
International Search Report of the parent international application, PCT/CN2015/085999, dated May 9, 2016.
Li Yang et al.; "Preparation and Drug-release Properties of Ibuprofen-loaded and Fluorescein-labeled Starch-based Nanospheres"; Chinese Journal of Applied Chemistry; vol. 28, Issue 10; Oct. 2011 (see abstract).

* cited by examiner

*Primary Examiner* — Yih-Horng Shiao
(74) *Attorney, Agent, or Firm* — Wang Law Firm, Inc.

(57) ABSTRACT

The present disclosure discloses a fluorescent starch nanocrystal and a preparation method and application thereof. Mainly based on the character that starch nanocrystal has an active hydroxyl group on the surface, the present disclosure introduces fluorescein isothiocyanate into the surface of the starch nanocrystal in the form of stable covalent bonds through a two-step chemical modification method: silane coupling and electrophilic addition of fluorescein, so as to prepare the starch nanocrystal with fluorescent properties. The preparation process of the present disclosure is simple and easy to operate, uses cheap and readily available raw materials, involves low cost, and allows the non-fluorescent starch nanocrystal to produce significant fluorescent properties without affecting the properties of the starch nanocrystal itself, thereby expanding the application of starch. Moreover, the fluorescent starch nanocrystal thus obtained has significant fluorescent properties, good biocompatibility and biodegradability, has application prospects in the fields of biosensor preparation, bioimaging marking and fluorescent analysis and detection, and can be further prepared into a novel nano-fluorescent probe with organic nano-particles as the matrix.

21 Claims, No Drawings

FLUORESCENT STARCH NANOCRYSTAL AND PREPARATION METHOD AND APPLICATION THEREOF

TECHNICAL FIELD

The present disclosure relates to a fluorescent nanocrystal material, particularly relates to a fluorescent starch nanocrystal and preparation method and application thereof, and belongs to the technical field of modified starch processing.

BACKGROUND

Starch nanocrystal is the remaining acid resistant crystalline portion of starch after acid hydrolysis of the amorphous region, is an organic nanoparticle, and has the following strengths, for example: 1) it is characterized by low cost, wide sources, biorenewability, biodegradability, good biocompatibility and non-toxicity, compared with inorganic nanoparticles, and can be widely used in life science fields, such as food, biology, pharmaceuticals, etc.; 2) it retains its original crystallinity, and has high mechanical strength.

However, the starch nanocrystal itself can not produce fluorescence, thereby restricting its application in the fields of bioimaging marking, biosensor preparation, in vitro and in vivo fluorescence imaging, automatic DNA sequencing, etc., and limiting further expansion of the application of starch nanocrystal.

Fluorescein isothiocyanate fails to directly react with the starch nanocrystal, and only trace amount of it is adsorbed, or it cannot be adsorbed on starch nanocrystal. If a fluorophore is introduced into the surface of starch nanocrystal, an active group shall be introduced with the help of a "crosslinking agent" to realize its chemical reaction with fluorescein. A silane coupling agent has two functional groups with different reactivities in its molecule, and can be adsorbed and condensed on the surface of starch nanocrystal, followed by subsequent coupling reaction, thereby introducing active amino groups into the surface of starch nanocrystal. Compared to other intermediate "crosslinking agents", it has simple reaction and high bonding efficiency, and improves the amount of amino groups introduced into the surface, so that it can further react with fluorescein isothiocyanate efficiently and realize preparation of fluorescent starch nanocrystal.

SUMMARY

The present disclosure mainly aims to provide a fluorescent starch nanocrystal and a preparation method thereof, so as to overcome the defects of the prior art.

In order to achieve the foregoing object of the disclosure, the technical solution adopted in the present disclosure includes:

Some embodiments provide a fluorescent starch nanocrystal, including a starch nanocrystal and a fluorophore modified on the surface of the starch nanocrystal by covalent bonds, wherein the fluorophore includes a fluorophore derived from isothiocyanate fluorescein.

Some embodiments further provide a method for preparing a fluorescent starch nanocrystal, including: surface modification of starch nanocrystal by chemical coupling through silane coupling reaction using γ-aminopropyl triethoxysilane, and then surface modification of the starch nanocrystal with a fluorophore derived from fluorescein isothiocyanate by covalent bonds through a reaction between the amino group on the surface of starch nanocrystal modified through silane coupling and the isothiocyano group of fluorescein isothiocyanate fluorophore, thereby obtaining the fluorescent starch nanocrystal.

According to a more preferred embodiment, the method for preparing the fluorescent starch nanocrystal includes:

(1) adding starch nanocrystal to an alkaline solution at a pH of 8.0 to 11.0 such that the concentration of the starch nanocrystal in the mixed system thus obtained is 1 w/v % to 8 w/v %, continuously stirring for 2 to 6 h, and obtaining alkali-activated starch nanocrystal;

(2) adding benzoyl peroxide to a mixed solution of ethanol and water such that the concentration of benzoyl peroxide in the mixed system is 0.1 w/v % to 0.8 w/v %, continuous stirring at 100 to 400 rpm at room temperature until benzoyl peroxide is fully dissolved, then adding γ-aminopropyl triethoxysilane such that the concentration of γ-aminopropyl triethoxysilane in the mixed system thus obtained is 1 v/v % to 5 v/v %, and obtaining silane hydrolysate through hydrolysis for 0.5 to 6 h;

(3) adding the activated starch nanocrystal finally obtained from step (1) to the silane hydrolysate obtained from step (2) such that the concentration of the starch nanocrystal in the mixed system thus obtained is 1 w/v % to 8 w/v %, continuously stirring for 2 to 6 h, and obtaining modified starch nanocrystal through rotatory evaporation, drying, washing and passing through a 60-100 mesh screen; and (4) adding the modified starch nanocrystal obtained from step (3) to a mixed solution of methanol and water containing 0.1 w/v % to 1.5 w/v % fluorescein isothiocyanate such that the concentration of the modified starch nanocrystal in the mixed system thus obtained is 0.1 w/v % to 2.0 w/v %, keeping in dark place at room temperature for 12 to 36 h, and obtaining the desired product.

More preferably, step (1) includes: adding starch nanocrystal to a strong alkali solution, continuously stirring, separating alkali-activated starch nanocrystal, and then washing with a mixed solution of ethanol and water.

More preferably, the concentration of ethanol contained in the mixed solution of ethanol and water in step (2) is 60 v/v % to 95 v/v %.

More preferably, step (3) includes:

obtaining modified starch nanocrystal through rotary evaporation under a vacuum degree of −0.1 to −0.06 Mpa and at a temperature of 50 to 55° C. after continuously stirring the activated starch nanocrystal and the silane hydrolysate, drying at 40 to 55° C. for 3 to 12 d, washing with water until pH value of the re-dispersed sample solution is constant, drying at 40 to 55° C. and then passing through a 60 to 100 mesh screen;

More preferably, the concentration of methanol contained in the mixed solution of methanol and water in step (4) is 55 v/v % to 90 v/v %.

The fluorescent starch nanocrystal prepared using any one of the foregoing methods can send out yellow-green fluorescence under ultraviolet light, has a characteristic absorption peak in the UV-visible spectrum at 490 nm, and has fluorescence emission at 520 nm with the excitation wavelength at 495 nm.

Furthermore, the fluorescent starch nanocrystal has a particle diameter of 30 to 120 nm. Furthermore, the photochemical stability of the fluorescent starch nanocrystal is increased. After continuous irradiation by a mercury lamp for 75 min, fluorescein isothiocyanate (FITC) only retains 22% to 34% fluorescence intensity, while the fluorescent starch nanocrystal retains 62% to 85% fluorescence intensity.

Furthermore, the surface of the fluorescent starch nanocrystal contains new elements: Si, N and S. As indicated by XPS analysis, the chemical groups, including C—N, Si—O—C and N—C=S, are newly generated on the surface of the fluorescent starch nanocrystal.

Some embodiments further provide a fluorescence detection reagent or device, including the fluorescent starch nanocrystal.

Compared with the prior art, the beneficial effects of the present disclosure include:

(1) With the preparation method of the present disclosure, the non-fluorescent starch nanocrystal produces significant fluorescent properties without affecting the properties of the starch nanocrystal itself, thereby expanding the application of starch. Moreover, the process is simple and easy to operate, uses cheap and readily available raw materials (for example, silane coupling agent KH-550 as the surface modifier), and involves low cost;

(2) The fluorescent starch nanocrystal of the present disclosure has significant fluorescent properties, and has less degradability and stronger photochemical stability than conventional fluorescein isothiocyanate. After continuous irradiation by a mercury lamp for 75 min, fluorescein isothiocyanate (FITC) only retains 22% to 34% fluorescence intensity, while the fluorescent starch nanocrystal retains 62% to 85% fluorescence intensity.

(3) The fluorescent starch nanocrystal according to the present disclosure has good fluorescent biocompatibility and biodegradability, has application prospects in the fields of biosensor preparation, bioimaging marking, fluorescent analysis and detection, etc., and can be further prepared into a novel nano-fluorescent probe with organic nano-particles as the matrix.

(4) An active amino group can be introduced into the surface of starch nanocrystal in a one-step reaction through adsorption, condensation and chemical coupling using a silane coupling agent (KH-550) as a reaction intermediate "crosslinking agent" without the need of additionally adding other intermediate "crosslinking agents", which is characterized by simple reaction and high bonding efficiency, and improves the amount of amino groups introduced into the surface, so as to further efficiently react with fluorescein isothiocyanate, trace amount of which is adsorbed, or which cannot be adsorbed on the surface of starch nanocrystal, and realize preparation of the fluorescent starch nanocrystal.

DESCRIPTION OF THE EMBODIMENTS

Hereinafter, the technical solution of the present disclosure will be illustrated in more detail. However, it will be appreciated that within the scope of the present disclosure, various technical features mentioned above and various technical features specifically described hereinafter (as in embodiments) of the present disclosure may be combined with each other to form new or preferred technical solutions. Due to space limitations, they are no longer repeated one by one here.

As described above, in view of the many defects of the prior art, the inventor of the present disclosure has presented the technical solutions of the present disclosure with details as follows, after prolonged and in-depth research and a lot of practice.

One aspect of the present disclosure provides a method for preparing fluorescent starch nanocrystal. Its principle is that: based on the character that starch nanocrystal has an active hydroxyl group on the surface, fluorescein isothiocyanate, trace amount of which is adsorbed, or which cannot be adsorbed, is introduced into the surface of the starch nanocrystal in the form of stable covalent bonds through a two-step chemical modification method: silane coupling and electrophilic addition of fluorescein with an amino silane coupling agent as a reaction intermediate "crosslinking agent", so as to prepare the starch nanocrystal with fluorescent properties.

Furthermore, the present disclosure modifies the surface of starch nanocrystal through silane coupling reaction using γ-aminopropyl triethoxysilane (KH-550) mainly with starch nanocrystal as the raw material; and then forms stable covalent bonds through electrophilic addition reaction of the amino group of starch nanocrystal and the isothiocyano group (N—C=S) of fluorescein isothiocyanate (FITC) in aqueous solution of methanol with KH-550 as a crosslinking agent, thereby introducing fluorescent properties into starch nanocrystal, and preparing a novel fluorescent starch nanocrystal with good biocompatibility and biodegradability.

According to a more specific embodiment, the preparation method includes the concrete steps as follows:

(1) alkali activation of starch nanocrystal

1% to 8% (w/v) starch nanocrystal is added to NaOH solution at a pH of 8.0 to 11.0, and stirred for 2 to 6 h, followed by centrifugal washing of alkali-activated starch nanocrystal with aqueous solution of ethanol.

(2) hydrolysis of silane coupling agent (KH-550)

0.1% to 0.8% (w/v) benzoyl peroxide is added to 60% to 95% (v/v) aqueous solution of ethanol. After benzoyl peroxide is fully dissolved by stirring at 100 to 400 rpm at room temperature, 1% to 5% (v/v) KH-550 is added to the reaction solution for hydrolysis for 0.5 to 6 h.

(3) surface modification of starch nanocrystal using silane coupling agent (KH-550): activated starch nanocrystal (1% to 5%, w/v) in step (1) is added to silane hydrolysate prepared in step (2), and stirred for 2~6 h before rotary evaporation (vacuum degree: −0.1 to −0.06 Mpa, water bath temperature: 50 to 55° C.). On completion of rotary evaporation, the sample is transferred to a watch glass, and dried in a drying oven at 40~55° C. for 3 to 12 d. Dried sample is washed by centrifugation with deionized water, until pH value of the re-dispersed sample solution is constant. Sample is dried in a drying oven at 40~55° C., and then passed through a 60 to 100 mesh screen.

(4) surface modification of starch nanocrystal using fluorescein isothiocyanate (FITC)

0.1% to 2.0% (w/v) modified starch nanocrystal prepared in step (3) is added to 200 mL of 55% to 90% (v/v) aqueous solution of methanol containing 0.1% to 1.5% (w/v) fluorescein isothiocyanate (FITC), and is kept in dark place at room temperature for 12 to 36 h. After centrifugal washing of the sample with deionized water, the supernatant is scanned using UV-visible absorption spectrum, until there is no characteristic absorption peak in the scanning spectrum, which is considered as that washing is completed. Then, the sample is dried in a drying oven in the dark at 40° C., passed through a 60 to 100 mesh screen, and kept in a refrigerator in the dark at 4° C.

Another aspect of the present disclosure provides a fluorescent starch nanocrystal, the fluorescent properties of which include: sending out yellow-green fluorescence when exposed to UV light; having a characteristic absorption peak detected in the UV-visible spectrum at 490 nm; and having a characteristic peak of fluorescent emission spectrum corresponding to fluorescein isothiocyanate detected at 520 nm with excitation wavelength at 495 nm and with excitation slit wavelength at 2.5 nm.

Compared with fluorescein isothiocyanate, the fluorescent starch nanocrystal according to the present disclosure has stronger photochemical stability. After continuous irradiation by a mercury lamp for 75 min, fluorescein isothiocyanate (FITC) only retains 22% to 34% fluorescence intensity, while the fluorescent starch nanocrystal retains 62% to 85% fluorescence intensity.

Furthermore, the surface of the fluorescent starch nanocrystal contains new elements: N, Si and S. As indicated by XPS analysis, fluorescent starch nanocrystal contains newly generated groups, including C—N, Si—O—C and N–C=S, proving that silane coupling agent (KH-550) and fluorescein isothiocyanate (FITC) have formed stable covalent bonds with starch nanocrystal.

The technical solution of the present disclosure is further illustrated with reference to a number of embodiments below.

Embodiment 1

1% (w/v) starch nanocrystal was added to NaOH solution at a pH of 8.0, and stirred for 2 h, followed by centrifugal washing of alkali-activated starch nanocrystal with aqueous solution of ethanol. 0.1% (w/v) benzoyl peroxide was added to 60% (v/v) aqueous solution of ethanol. After benzoyl peroxide was fully dissolved by stirring at 100 rpm at room temperature, 1% (v/v) KH-550 was added to the reaction solution for hydrolysis for 0.5 h. 1% (w/v) alkaline-activated starch nanocrystal was added, and stirred for 2 h before rotary evaporation (vacuum degree: −0.06 MPa, water bath temperature: 50° C.). On completion of rotary evaporation, the residue was dried in a drying oven at 40° C. for 3 d. On completion of drying, the sample was washed by centrifugation with deionized water, until pH value of the re-dispersed sample solution was constant. After dried in a drying oven at 40° C. and passed through a 60 mesh screen, 0.1% (w/v) sample was added to 200 mL of 55% (v/v) aqueous solution of methanol containing 0.1% (w/v) fluorescein isothiocyanate (FITC), and was kept in dark place at room temperature for 12 h. After centrifugal washing of the sample with deionized water, the supernatant was scanned using UV-visible absorption spectrum, until there was no characteristic absorption peak in the scanning spectrum. The sample was dried in a drying oven in the dark at 40° C., passed through a 60 mesh screen, and kept in a refrigerator in the dark at 4° C., and then fluorescent starch nanocrystal was obtained.

Observation under a high resolution TEM shows that, the fluorescent starch nanocrystal has a particle size distribution in a range of about 30 to 120 nm, but is mainly focused on below 50 nm. 0.05% (w/v) aqueous solution of fluorescent starch nanocrystal is measured to have a characteristic peak of fluorescence emission spectrum at 547 nm with the excitation wavelength at 495 nm, and with excitation slit width at 2.5 nm. Its peak fluorescence intensity is $1.62\times10^7$. It can send out yellow-green fluorescence when exposed to UV light.

After continuous irradiation by a mercury lamp for 75 min, the fluorescent starch nanocrystal retains 85% fluorescence intensity, while fluorescein isothiocyanate (FITC) only retains 23% fluorescence intensity. Moreover, the surface of the fluorescent starch nanocrystal contains new elements: Si, N and S. As indicated by XPS analysis, the chemical groups, including C—N, Si—O—C and N–C=S, are newly generated on the surface of the fluorescent starch nanocrystal.

Embodiment 2

8% (w/v) starch nanocrystal was added to NaOH solution at a pH of 11.0, and stirred for 6 h, followed by centrifugal washing of alkali-activated starch nanocrystal with aqueous solution of ethanol. 0.8% (w/v) benzoyl peroxide was added to 95% (v/v) aqueous solution of ethanol. After benzoyl peroxide was fully dissolved by stirring at 400 rpm at room temperature, 5% (v/v) KH-550 was added to the reaction solution for hydrolysis for 6 h. 8% (w/v) alkaline-activated starch nanocrystal was added, and stirred for 6 h before rotary evaporation (vacuum degree: −0.1 MPa, water bath temperature: 55° C.). On completion of rotary evaporation, the residue was dried in a drying oven at 55° C. for 12 d. On completion of drying, the sample was washed by centrifugation with deionized water, until pH value of the re-dispersed sample solution was constant. After dried in a drying oven at 55° C. and passed through a 100 mesh screen, 2.0% (w/v) sample was added to 200 mL of 90% (v/v) aqueous solution of methanol containing 1.5% (w/v) fluorescein isothiocyanate (FITC), and was kept in dark place at room temperature for 36 h. After centrifugal washing of the sample with deionized water, the supernatant was scanned using UV-visible absorption spectrum, until there was no characteristic absorption peak in the scanning spectrum. The sample was dried in a drying oven in the dark at 40° C., passed through a 60 to 100 mesh screen, and kept in a refrigerator in the dark at 4° C., and then fluorescent starch nanocrystal was obtained. Moreover, the surface of the fluorescent starch nanocrystal contains new elements: Si, N and S. 0.05% (w/v) aqueous solution of fluorescent starch nanocrystal is measured to have a characteristic peak of fluorescence emission spectrum at 547 nm with the excitation wavelength at 495 nm, and with excitation slit width at 2.5 nm. Its peak fluorescence intensity is $1.73\times10^7$. It can send out yellow-green fluorescence when exposed to UV light.

Embodiment 3

2% (w/v) starch nanocrystal was added to NaOH solution at a pH of 9.5, and stirred for 4 h, followed by centrifugal washing of alkali-activated starch nanocrystal with aqueous solution of ethanol. 0.2% (w/v) benzoyl peroxide was added to 90% (v/v) aqueous solution of ethanol. After benzoyl peroxide was fully dissolved by stirring at 150 rpm at room temperature, 3% (v/v) KH-550 was added to the reaction solution for hydrolysis for 1 h. 2% (w/v) alkaline-activated starch nanocrystal was added, and stirred for 3 h before rotary evaporation (vacuum degree: −0.1 MPa, water bath temperature: 53° C.). On completion of rotary evaporation, the residue was dried in a drying oven at 55° C. for 9 d. On completion of drying, the sample was washed by centrifugation with deionized water, until pH value of the re-dispersed sample solution was constant. After dried in a drying oven at 55° C. and passed through a 60 to 100 mesh screen, 0.3% (w/v) sample was added to 200 mL of 80% (v/v) aqueous solution of methanol containing 0.3% (w/v) fluorescein isothiocyanate (FITC), and was kept in dark place at room temperature for 24 h. After centrifugal washing of the sample with deionized water, the supernatant was scanned using UV-visible absorption spectrum, until there was no characteristic absorption peak in the scanning spectrum. The sample was dried in a drying oven in the dark at 40° C., passed through a 60 to 100 mesh screen, and kept in a refrigerator in the dark at 4° C., and then fluorescent starch nanocrystal was obtained. Moreover, the surface of the fluorescent starch nanocrystal contains new elements: Si, N and S. 0.05% (w/v) aqueous solution of fluorescent starch nanocrystal is measured to have a characteristic peak of fluorescence emission spectrum at 547 nm with the excitation wavelength at 495 nm, and with excitation slit width at 2.5 nm. Its peak fluorescence intensity is $1.67 \times 10^7$. It can send out yellow-green fluorescence when exposed to UV light.

The present disclosure allows starch nanocrystal to have fluorescent properties through a two-step surface modification with an organic nano-particle starch nanocrystal as the raw material, then obtains a novel fluorescent starch nanocrystal with biodegradability and good bio-compatibility, and broadens the scope of application of starch.

The above description is only one of the preferred embodiments. It shall be noted that, those skilled in the art may also make a number of detail changes without departing from the principle of the present disclosure, and such detail changes shall also be regarded as falling within the scope of protection of the present disclosure. For a better understanding of the aforementioned embodiments of the invention as well as additional embodiments thereof, reference should be made to the Description of Embodiments below, in conjunction with the following drawings in which like reference numerals refer to corresponding parts throughout the figures.

The invention claimed is:

1. A method for preparing a fluorescent starch nanocrystal, the method comprising:
   (1) an activating step consisting of adding 1 w/v % to 8 w/v % of starch nanocrystal to an alkaline solution having a pH of 8.0 to 11.0 and continuously stirring for 2 to 6 h to obtain an alkali-activated starch nanocrystal, and optionally separating and washing the alkali-activated starch nanocrystal with a mixed solution of ethanol and water;
   (2) adding 0.1 w/v % to 0.8 w/v % of benzoyl peroxide to a mixed solution of ethanol and water and continuously stirring at 100 to 400 rpm at room temperature until benzoyl peroxide is fully dissolved to form a benzoyl peroxide solution, then adding 1 v/v % to 5 v/v % γ-aminopropyl triethoxysilane to the benzoyl peroxide solution to carry out hydrolysis for 0.5 to 6 h to form a silane hydrolysate solution;
   (3) adding the activated starch nanocrystal of step (1) to the silane hydrolysate solution of step (2) and continuously stirring for 2 to 6 h followed by rotary evaporation and drying to obtain amino silane modified starch nanocrystal; and
   (4) adding 0.1 w/v % to 2.0 w/v % of the amino silane modified starch nanocrystal obtained from step (3) to a mixed solution of methanol and water containing 0.1 w/v % to 1.5 w/v % fluorescein isothiocyanate and keeping in dark place at room temperature for 12 to 36 h to obtain the fluorescent starch nanocrystal.

2. The method of claim 1, wherein the concentration of ethanol contained in the mixed solution of ethanol and water in step (2) is 60 v/v % to 95 v/v %.

3. The method of claim 1, wherein in step (3) the rotary evaporation is conducted under a vacuum degree of −0.1 to −0.06 Mpa and at a temperature of 50 to 55° C., followed by drying at 40 to 55° C. for 3 to 12 d, and the dried amino silane modified starch nanocrystal is re-dispersed and washed with water until pH value is constant before drying at 40 to 55° C. and then passing through a 60 to 100 mesh screen.

4. The method of claim 1, wherein the concentration of methanol contained in the mixed solution of methanol and water in step (4) is 55 v/v % to 90 v/v %.

5. The method of claim 1, wherein in step (4), after kept in dark place at room temperature for 12 to 36 h, the fluorescent starch nanocrystal is further subjected to centrifugal washing until the supernatant has no characteristic absorption peak in a scanning spectrum, and the washed fluorescent starch nanocrystal is then dried in the dark at 40° C. and passed through a 60 to 100 mesh screen.

6. The method of claim 1, wherein the alkaline is sodium hydroxide.

7. A fluorescent starch nanocrystal prepared using the method of claim 1, capable of sending out yellow-green fluorescence under ultraviolet light, having a characteristic absorption peak in the UV-visible spectrum at 490 nm, and having fluorescence emission at 547 nm with the excitation wavelength at 495 nm.

8. The fluorescent starch nanocrystal of claim 7, wherein the nanocrystal has a particle diameter of 30 to 120 nm.

9. A fluorescent detection reagent, comprising the fluorescent starch nanocrystal of claim 7.

10. A fluorescent detection device, comprising the fluorescent starch nanocrystal of claim 7.

11. The fluorescent starch nanocrystal of claim 7, wherein after continuous irradiation by a mercury lamp for 75 min, the fluorescent starch nanocrystal retains 62% to 85% fluorescence intensity.

12. A method for preparing a fluorescent starch nanocrystal, the method comprising:
   (1) an activating step consisting of adding 1 w/v % to 8 w/v % of starch nanocrystal to a sodium hydroxide solution having a pH of 8.0 to 11.0 and continuously stirring for 2 to 6 h to obtain an alkali-activated starch nanocrystal, which is subsequently separated and then washed with aqueous ethanol;
   (2) adding 0.1 w/v % to 0.8 w/v % of benzoyl peroxide to 60 v/v % to 95 v/v % aqueous ethanol and continuously stirring at 100 to 400 rpm at room temperature until benzoyl peroxide is fully dissolved to form a benzoyl peroxide solution, then adding 1 v/v % to 5 v/v % γ-aminopropyl triethoxysilane to the benzoyl peroxide solution to carry out hydrolysis for 0.5 to 6 h to form a silane hydrolysate solution;
   (3) adding the activated starch nanocrystal of step (1) to the silane hydrolysate solution of step (2) and continuously stirring for 2 to 6 h to form a reaction mixture followed by conducting rotary evaporation of the reaction mixture under a vacuum degree of −0.1 to −0.06 Mpa and at a temperature of 50 to 55° C., followed by drying at 40 to 55° C. for 3 to 12 d, and the dried amino silane modified starch nanocrystal is re-dispersed and washed with water until pH value is constant before drying at 40 to 55° C. and then passing through a 60 to 100 mesh screen and
   (4) adding 0.1 w/v % to 2.0 w/v % of the amino silane modified starch nanocrystal obtained from step (3) to a 55 v/v % to 90 v/v % aqueous methanol containing 0.1 w/v % to 1.5 w/v % fluorescein isothiocyanate and keeping in dark place at room temperature for 12 to 36 h to obtain the fluorescent starch nanocrystal.

13. A fluorescent starch nanocrystal prepared using the method of claim 12, capable of sending out yellow-green fluorescence under ultraviolet light, having a characteristic absorption peak in the UV-visible spectrum at 490 nm, and having fluorescence emission at 547 nm with the excitation wavelength at 495 nm.

14. The fluorescent starch nanocrystal of claim 13, wherein the nanocrystal has a particle diameter of below 50 nm.

15. A fluorescent detection reagent, comprising the fluorescent starch nanocrystal of claim 13.

16. A fluorescent detection device, comprising the fluorescent starch nanocrystal of claim 13.

17. The fluorescent starch nanocrystal of claim 13, wherein after continuous irradiation by a mercury lamp for 75 min, the fluorescent starch nanocrystal retains 62% to 85% fluorescence intensity.

18. A method for preparing a fluorescent starch nanocrystal, the method comprising:
   (1) an activating step consisting of adding 1 w/v % to 8 w/v % of starch nanocrystal to a sodium hydroxide solution having a pH of 8.0 to 11.0 and continuously stirring for 2 to 6 h to obtain an alkali-activated starch nanocrystal, which is subsequently separated and then washed with aqueous ethanol;
   (2) adding 0.1 w/v % to 0.8 w/v % of benzoyl peroxide to 60 v/v % to 95 v/v % aqueous ethanol and continuously stirring at 100 to 400 rpm at room temperature until benzoyl peroxide is fully dissolved to form a benzoyl peroxide solution, then adding 1 v/v % to 5 v/v % γ-aminopropyl triethoxysilane to the benzoyl peroxide solution to carry out hydrolysis for 0.5 to 6 h to form a silane hydrolysate solution;
   (3) adding the activated starch nanocrystal of step (1) to the silane hydrolysate solution of step (2) and continuously stirring for 2 to 6 h to form a reaction mixture followed by conducting rotary evaporation of the reaction mixture under a vacuum degree of −0.1 to −0.06 Mpa and at a temperature of 50 to 55° C., followed by drying at 40 to 55° C. for 3 to 12 d, and the dried amino silane modified starch nanocrystal is re-dispersed and washed with water until pH value is constant before drying at 40 to 55° C. and then passing through a 60 to 100 mesh screen and
   (4) adding 0.1 w/v % to 2.0 w/v % of the amino silane modified starch nanocrystal obtained from step (3) to a 55 v/v % to 90 v/v % aqueous methanol containing 0.1 w/v % to 1.5 w/v % fluorescein isothiocyanate and keeping in dark place at room temperature for 12 to 36 h to obtain the fluorescent starch nanocrystal, which is subjected to centrifugal washing until the supernatant has no characteristic absorption peak in a scanning spectrum, and the washed fluorescent starch nanocrystal is then dried in the dark at 40° C. and passed through a 60 to 100 mesh screen.

19. A fluorescent starch nanocrystal prepared using the method of claim 18, capable of sending out yellow-green fluorescence under ultraviolet light, having a characteristic absorption peak in the UV-visible spectrum at 490 nm, having fluorescence emission at 547 nm with the excitation wavelength at 495 nm, and a particle diameter of below 50 nm, and wherein after continuous irradiation by a mercury lamp for 75 min, the fluorescent starch nanocrystal retains 62% to 85% fluorescence intensity.

20. A fluorescent detection reagent, comprising the fluorescent starch nanocrystal of claim 19.

21. A fluorescent detection device, comprising the fluorescent starch nanocrystal of claim 19.

* * * * *